(12) United States Patent
Bindra

(10) Patent No.: US 6,375,733 B1
(45) Date of Patent: Apr. 23, 2002

(54) HEAT STABLE MONOAZO MAGENTA PIGMENT COMPOSITIONS

(75) Inventor: Amrit P. Bindra, Brecksville, OH (US)

(73) Assignee: Engelhard Corporation, Iselin, NJ (US)

( * ) Notice: Subject to any disclaimer, the term of this patent is extended or adjusted under 35 U.S.C. 154(b) by 36 days.

(21) Appl. No.: 09/649,540

(22) Filed: Aug. 28, 2000

(51) Int. Cl.[7] ............................................... C09B 63/00
(52) U.S. Cl. ..................... 106/496; 106/402; 106/494; 106/31.8; 534/581; 534/602; 534/883; 524/190
(58) Field of Search ................................ 106/496, 494, 106/402, 31.8; 534/581, 602, 883; 524/190

(56) References Cited

U.S. PATENT DOCUMENTS

| | | | |
|---|---|---|---|
| 4,167,422 A | 9/1979 | Bellanca et al. | 106/289 |
| 4,486,237 A | 12/1984 | Paffoni et al. | 106/308 Q |
| 4,594,411 A | 6/1986 | Henning | 534/784 |
| 4,628,082 A | 12/1986 | Lorenz et al. | 534/707 |
| 4,664,715 A | 5/1987 | Jesse | 106/309 |
| 4,810,302 A | 3/1989 | Funatsu et al. | 106/402 |
| 4,968,351 A | 11/1990 | Ahmed et al. | 106/402 |
| 4,980,458 A | 12/1990 | Hari et al. | 534/575 |
| 5,047,517 A | 9/1991 | Deucker | 534/784 |
| 5,084,106 A | 1/1992 | Kobayashi et al. | 106/402 |
| 5,102,466 A | 4/1992 | Mordente et al. | 106/496 |
| 5,457,188 A | 10/1995 | Zimmermann | 534/780 |
| 5,669,967 A | 9/1997 | Hays | 106/496 |
| 5,677,435 A | * 10/1997 | Bindra | 534/883 |
| 5,733,365 A | 3/1998 | Halko et al. | 106/437 |
| 5,744,590 A | 4/1998 | Chorlton et al. | 534/780 |
| 5,746,821 A | 5/1998 | Hays | 106/496 |
| 5,747,571 A | * 5/1998 | Bindra | 524/190 |
| 6,001,167 A | * 12/1999 | Bindra | 106/402 |

FOREIGN PATENT DOCUMENTS

| | | | |
|---|---|---|---|
| EP | 0052069 | 5/1982 | C09B/63/00 |
| EP | 0841367 A2 | 11/1997 | C08K/5/42 |
| GB | 1516223 | 1/1976 | C09B/63/00 |
| WO | WO9622334 | 7/1996 | C09B/63/00 |

* cited by examiner

*Primary Examiner*—Anthony Green
(74) *Attorney, Agent, or Firm*—Raymond F. Keller

(57) ABSTRACT

Disclosed are blue shade red to magenta monoazo pigments which are obtained by diazotization of 5-alkoxy-2-aminobenzenesulfonic acids, coupling of the diazonium compound with a hydoxynaphthalenesulfonic acid and subsequent laking of the coupling product with a divalent metal salt. The pigments are characterized by the formula:

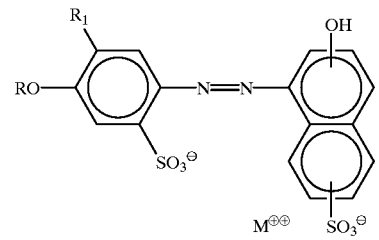

wherein R is a lower alkyl, e.g. a methyl or ethyl group, or a hydroxycarbyl group, $R_1$ is hydrogen, chloro, a lower alkyl group such as methyl or ethyl, or a lower alkoxy group such as a methoxy or an ethoxy group, and M is Ca, Sr, Ba, Mn, Mg or Zn. The new pigments have a magenta color, excellent heat stability, bleed fastness and very high color strength. These pigments are suitable for the pigmenting of plastics, inks and coatings, among other materials.

23 Claims, No Drawings

HEAT STABLE MONOAZO MAGENTA PIGMENT COMPOSITIONS

FIELD OF THE INVENTION

This invention relates to novel azo blue shade red to magenta pigments, processes for their preparation and to coating, plastic and ink compositions containing such pigments.

BACKGROUND OF THE INVENTION

Azo pigments are a class of colorants that are tinctorially strong and relatively inexpensive. Commercially available heat stable azo pigments commonly used in plastics are limited to the color range of yellow, orange and red shades such as Pigment Yellow 61, Pigment Yellow 62, Pigment Yellow 183, Pigment Yellow 191, Pigment Yellow 205, Pigment Yellow 206, Pigment Yellow 209, Pigment Yellow 209:1, Pigment Yellow 210, Pigment Yellow 212, Pigment Orange 79, Pigment Red 276, Pigment Red 277, etc. Consequently, there is an unmet need to extend the shade range of azo pigments to magenta color pigments that show comparable performance in properties such as color strength, resistance to polar solvents, light fastness and/or heat stability. It is desirable to extend the shade range of azo pigments to a magenta color and thereby increase the range of colors available using such pigments.

SUMMARY OF THE INVENTION

This invention relates to blue shade red to magenta pigments suitable for use as coloring agents, and processes for their preparation. The magenta azo pigments of the present invention have excellent heat stability, bleed fastness and very high color strength. As a result, these pigments are suitable for use in the pigmenting of plastics, inks and coatings, among other materials, but especially in plastics where exposure to high temperatures is often encountered.

One aspect of the invention relates to a composition containing at least one compound characterized by the formula:

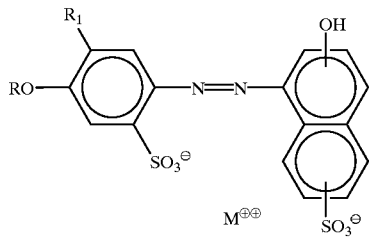

Formula (I)

wherein R is a lower alkyl group or a hydroxycarbyl group, $R_1$ is hydrogen, chloro, a lower alkyl group, or a lower alkoxy group, and M is Ca, Sr, Ba, Mn, Mg or Zn.

Another aspect of the invention relates to a process for preparing an azo pigment involving the steps of coupling at least one diazonium component of one or more aromatic amines, wherein at least one aromatic amine has the formula:

Formula (II)

wherein R is a lower alkyl group or a hydroxycarbyl group and $R_1$ is hydrogen, chloro, a lower alkyl group, or a lower alkoxy group with at least one hydroxynaphthalenesulfonic acid coupling component to form an azo dye; and metallizing the azo dye with a divalent metal.

DETAILED DESCRIPTION OF THE INVENTION

The present invention relates to metallized azo blue shade red to magenta pigments suitable for use as a coloring agent, methods of making and using the metallized azo magenta pigments, and plastics, coatings and inks containing the metallized azo magenta pigments. Metallized azo magenta pigments according to the present invention exhibit high tinctorial strengths while simultaneously exhibiting good heat stability. In addition, the metallized azo magenta pigments according to the present invention exhibit a combination of good heat stability and good lightfastness, in comparison to different metallized azo pigments. In many embodiments, the metallized azo magenta pigments according to the present invention contain few (no more than about 1) halogen atom per pigment molecule, so the metallized azo magenta pigments are environmentally friendly.

Generally speaking, the azo pigments of the present invention are prepared by initially diazotizing one or more aromatic amines suitable for use in this invention and thereafter coupling the diazonium component with a coupling component suitable for use in this invention to form the desired dye. The dye can be metallized by any suitable means, as described more fully below.

Aromatic amines suitable for the present invention are those characterized by the formula:

Formula (II)

wherein R is a lower alkyl group or a hydroxycarbyl group and $R_1$ is hydrogen, chloro, methyl, ethyl or lower alkoxy group. Hydroxycarbyl groups include hydroxyalkyl groups, hydroxyalkenyl groups, and the like. Lower alkyl groups and lower alkoxy groups contain from 1 to about 4 carbon atoms. Examples include methyl, methoxy, ethyl, ethoxy, propyl, propoxy, butyl and butoxy (all isomers included). One or more of the aromatic amines characterized by Formula (II) may be employed when making the azo magenta pigments of the present invention.

Examples of the aromatic amine include 2-amino-5-methoxy-benzenesulfonic acid; 2-amino-5-ethoxy-benzenesulfonic acid, 2-amino-4-chloro-5-methoxy-benzenesulfonic acid; 2-amino-4-chloro-5-ethoxybenzenesulfonic acid; 2-amino-4-methyl-5-methoxy-benzenesulfonic acid; 2-amino-4-ethyl-5-methoxy-benzenesulfonic acid; 2-amino-4,5-dimethoxy-benzenesulfonic acid; 2-amino-4-methyl-5-ethoxy-benzenesulfonic acid; 2-amino-4-ethyl-5-ethoxy-benzenesulfonic acid; and 2-amino-4,5-diethoxy-benzenesulfonic acid.

In one embodiment, mixtures of two or more aromatic amines, wherein at least one of the amines is characterized by Formula (II), are diazotized, then coupled with the hydroxynaphthalenesulfonic acid coupler. In this embodiment, aromatic amines that are not characterized by Formula (II) are supplemental aromatic amines. Such supplemental aromatic amines can be useful for shade adjustments of the pigments of the present invention.

A variety of suitable supplemental aromatic amines can be mixed with aromatic amines characterized by Formula (II) for the purposes of the present invention. In one embodiment, the supplemental aromatic amines include primary aromatic amines wherein the aromatic moiety of the amines contains at least one substituent acid group or salts thereof, and preferably the alkali metal or ammonium salts of such supplemental aromatic amines. The aromatic amines may be monoamines or polyamines containing up to about four or more amine groups per molecule. Thus, the diazonium components derived from such supplemental aromatic amines may contain one diazonium group (mono-diazonium), two diazonium groups (bis-diazonium), three diazonium groups (tris-diazonium), etc. The supplemental aromatic aromatic amines may be monocyclic amines such as aniline and its derivatives, or bicyclic amines such as naphthyl amines and their derivatives. The supplemental aromatic aromatic amines may also be biphenylamines or polyamines such as aminobiphenyl, benzidine, and 3,3',4,4'-biphenyltetramine.

In another embodiment, the supplemental aromatic amine is a primary aromatic amine characterized by the formula (Formula III)

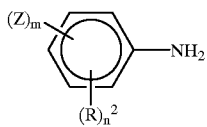

wherein each $R^2$ is independently a halogen, hydrocarbyl, hydrocarbyloxy, carboxylic acid ester, sulfonic acid ester, carboxylic acid amide, imidazolone, sulfonic acid amide or nitro group; n is 0, 1 or 2; each Z is independently a —COOH or —SO$_3$H group, or salts of such groups; m is 1 or 2; wherein it is understood that the imidazalone group is represented by the formula —NH—C—NH— which, when taken together with the aromatic ring, the nitrogen atoms are bonded to adjacent carbons to form a five member ring, and Formula (III) is not an aromatic amine characterized by Formula (II). The term "hydrocarbyl" as used in this specification and claims is intended to include hydrocarbons which may contain heteroatom containing substituent groups such as ether, ester, hydroxy, nitro or halogen which do not materially affect the hydrocarbon character of the group. The hydrocarbyl and hydrocarbyloxy groups typically contain from 1 to about 20 carbon atoms.

In another embodiment, the supplemental aromatic amines characterized by Formula (III) contain 0, 1 or 2 $R^2$ groups which are each independently a halogen, hydrocarbyl, hydrocarbyloxy, carboxylic acid ester, sulfonic acid ester, carboxylic acid amide, imidazolone, sulfonic acid amide or nitro group. The halogen group can be any of the halogens, although chlorine and bromine are generally used, with chlorine being the most preferred example of a halogen substituent. The hydrocarbyl groups may independently be alkyl, cycloalkyl, aryl, aralkyl or alkaryl groups containing from 1 to about 20 carbon atoms. For example, if $R^2$ is an unsubstituted aryl group, the aromatic amine is a biphenyl amine. When $R^2$ is an alkyl group, the alkyl group generally contains from one to about 4 carbon atoms. When $R^2$ is a hydrocarbyloxy group, the hydrocarbyl moiety may be any of the hydrocarbyl groups discussed above although the hydrocarbyloxy group generally is an alkoxy group containing from 1 to about 4 or even more carbon atoms. Preferred $R^2$ groups are methyl, ethyl and chloro groups.

In yet another embodiment, the supplemental aromatic amines characterized by Formula (III) also contain one or two acid groups of —COOH and/or —SO$_3$H, and/or salts thereof. In a preferred embodiment, the supplemental aromatic amine of Formula (III) contains an —SO$_3$H group.

Examples of supplemental aromatic amines characterized by Formula (III) wherein Z is a sulfonic acid group and m is 1 include 2-aminobenzene-1-sulfonic acid, 4-aminobenzene-1-sulfonic acid, 2-amino-5-methylbenzene-1-sulfonic acid, 3-amino-6-methylbenzene-1-sulfonic acid, 2-amino-4-chloro-5-methylbenzene-1-sulfonic acid, 2-amino-5-chloro-4-ethylbenzene-1-sulfonic acid, 2-amino-5-chloro-4-methylbenzene-1-sulfonic acid, etc.

Examples of supplemental aromatic amines characterized by Formula (III) wherein Z is a carboxylic acid group, and m is 1 include 3-aminobenzoic acid, 4-aminobenzoic acid, 2-amino-5-methylbenzoic acid, 2-amino-6-methylbenzoic acid, 3-amino-2-methylbenzoic acid, 2-amino-3-methoxybenzoic acid, 4-amino-3-methoxybenzoic acid, 4-amino-5-chloro-2-methoxybenzoic acid, 2-amino-4-chlorobenzoic acid, 3-amino-4-chlorobenzoic acid, etc. The benzene sulfonic acid and benzoic acid compounds can be used per se or as their salts. Examples of preferred salts include the alkali metal salts such as the sodium and potassium salts.

In still yet another embodiment, the supplemental aromatic amines are fused cyclic aromatic amine compounds such as compounds derived from naphthalene including 2-aminonaphthalene-1-sulfonic acid, 4-aminonaphthalene-1-sulfonic acid, etc. Examples of supplemental aromatic amines which are biphenyl amines and polyamines include 4-aminobiphenyl-3'-sulfonic acid, and 4,4'-diaminobiphenyl-2,2'-disulfonic acid.

The diazotization of the aromatic amines and supplemental aromatic amines is carried out in any suitable manner, such as those known to those skilled in the art. In one embodiment, the diazotization is carried out through the use of alkali metal nitrites or lower alkyl nitrites together with an adequately strong acid such as a mineral acid. Examples of useful mineral acid include hydrochloric acid and sulfuric acid. Nitrosyl sulfuric acid also can be utilized. In one embodiment, the diazotization reaction is conducted at a temperature from about −20° C. to 30° C. In another embodiment, the diazotization reaction is conducted at a temperature from about −5° C. to about 25° C. In yet another embodiment, the diazotization reaction is conducted at a temperature from about 0° C. to about 15° C.

In one embodiment, a surface-active agent, such as a non-ionic, anionic or cationic surface active agent, is included in the diazotization reaction and/or in the subsequent coupling reaction. Examples of surface active agents include amine oxide surfactants, and specifically cationic amine oxide surfactants, sulfosuccinate surfactants and derivatives thereof and specifically anionic sulfosuccinate surfactants and derivatives thereof.

Amine oxide surfactants include N,N-bis(2-hydroxyethyl)cocoalkylamine oxide, N,N-dimethylcocoalkylamine oxide, dimethyl (hydrogenated tallow) amine oxide, dimethylhexadecylamine oxide, bis(2-hydroxyethyl)tallowamine oxide, coco amidopropyl amine oxide, lauryl (12,14,16 blend) dimethyl amine oxide, myristyl dimethyl amine oxide, cocamidopropylamine oxide, and stearyl dimethylamine oxide. Examples include those under the trade designation Aromox available from Akzo Nobel Chemicals and specifically product designations C/12, C/12W, DMC, DMC-W, DMHT, DM16, and T/12; those under the trade designation Barlox® available from Lonza and specifically product designations C, 12 and 14; those under the trade designation DeMox available from DeForest Enterprises and specifically product designations CAPO and LAO; and those under the trade designation Schercamox available from Scher Chemicals and specifically product designation DMS.

Sulfosuccinate surfactants include disodium ethoxylated-alcohol half ester of sulfosuccinic acid, disodium ethoxylated nonylphenol half ester of sulfosuccinic acid, dicyclohexyl ester of sodium sulfosuccinic acid, disodium isodecyl sulfosuccinate, diamyl ester of sodium sulfosuccinic acid, dihexyl ester of sodium sulfosuccinic acid, sodium salt of sulfated nonylphenoxy polyethoxy ethanol, dioctyl ester of sodium sulfosuccinic acid, bis(tridecyl) ester of sodium sulfosuccinic acid, and disodium alkyl sulfosuccinate. Examples include those under the trade designation Aerosol available from Cytec Industries and specifically product designations A-102, A-103, A-196, A-268, AY, MA-801, NPES, OT, TR-70 and 501; those under the trade designation Geropon available from Rhone-Poulenc and specifically product designations SDS, SS-O and 99; and those under the trade designation Mackanate available from The McIntyre Group and specifically product designations DOS-70M5 and DOS-75.

In a preferred embodiment, the sulfosuccinate surfactant is a sodium dialkylsulfosuccinate surfactant having the molecular formula:

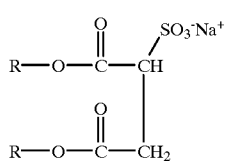

Formula (IV)

in which R is an alkyl group having from about 3 to about 20 carbon atoms and preferably from about 4 to about 13 carbon atoms.

In one embodiment, an organic solvent is included in the diazotization reaction and/or in the subsequent coupling reaction. Organic solvents include, for example, one or more of glacial acetic acid, lower alkanols, dioxane, formamide, dimethyl formamide, dimethyl sulfoxide, pyridine and N-methyl pyrrolidone. In another embodiment, an organic solvent is not included in the diazotization reaction and/or in the subsequent coupling reaction.

The hydroxynaphthalenesulfonic acid couplers useful for the purposes of this invention are represented by the formula:

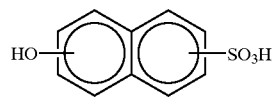

Formula (V)

Examples of the hydroxynaphthalenesulfonic acid couplers useful for the purposes of this invention include one or more of 1-hydroxynaphthalene-4-sulfonic acid; 1-hydroxynaphthalene-5-sulfonic acid; 1-hydroxynaphthalene-8-sulfonic acid; 2-hydroxynaphthalene-6-sulfonic acid; etc.

In one embodiment, mixtures of two or more couplers wherein at least one of the couplers is a hydroxynaphthalenesulfonic acid and at least one secondary coupler not represented by Formula (V) are employed to make the azo magenta pigments of the present invention. Secondary couplers not represented by Formula (V) include pyrazolone couplers, naphthalene couplers not represented by Formula (v), naphthoic acid couplers, and the like.

In one embodiment, the coupling reaction is effected preferably by adding the diazonium components to coupling components. In another embodiment, the coupling components are added to the diazonium components. Coupling is generally effected at a temperature from about −20° C. to about 80° C. In a preferred embodiment, coupling is conducted at a temperature from about 0° C. to about 60° C. In another preferred embodiment, coupling is conducted at a temperature from about 10° C. to about 50° C. Coupling is generally effected at a pH of from about 4 to about 12. In another embodiment, coupling is effected at a pH of from about 5 to about 11. As in the diazotization reaction, coupling is optionally carried out in the presence of a suitable surface active agent and/or organic solvent, such as those identified above for the diazotization reaction.

In one embodiment, the coupling component is dissolved in a basic solution such as an aqueous alkali metal hydroxide solution and reprecipitated with a dilute acid such as acetic acid.

In another embodiment, generally, the diazonium component is coupled with a slight stoichiometric excess of the coupling component. That is, one equivalent of the diazonium component is coupled with slightly more than one equivalent of the coupling component. In one embodiment, the ratio of equivalents of the diazonium component to the coupling component is from about 0.8:1 to about 1.1:1. In another embodiment, the ratio of equivalents of the diazonium component to the coupling component is from about 0.9:1 to about 1:1.

In yet another embodiment of the present invention, the dispersibility of the pigments of the present invention is improved by adding alkali-soluble resin-like products before, during, or after the coupling is completed or after the metallization discussed below. Various resin-like materials can be added for this purpose, and these include for example, rosin resins, polymeric rosins, resin soap, chemically modified rosin resins such as rosin-maleinate resins, alkyd resins, and other synthetic hydrocarbon resins with a higher acid number, or combination of these resins. The resins may be present in a product with free carboxyl groups that are capable of forming a salt, or may be partially or completely in the form of salts, for example, with alkali metal ions.

In still yet another embodiment, the coupling reaction is performed in the presence of a finely divided insoluble material. Examples of finely divided insoluble materials include alkaline earth metal sulfates and carbonates, titanium dioxide or clay materials or very finely divided organic plastic materials.

The composition prepared by the above-described coupling reaction can be metallized by a suitable divalent metal salt which forms the sulfonate salt. This is also known as laking and forms the azo pigment. The metal salt contains at least one of calcium, strontium, barium, manganese, magnesium, and zinc. Examples of divalent metal salts include the acetate, bromide, chloride, fluoride, hydroxide, iodide, and nitrate salts of calcium, strontium, barium, manganese, magnesium, and zinc.

In one embodiment, metallization is accomplished by adding the divalent metal salt to the dye after coupling all of the diazonium component present. In another embodiment, metallization is accomplished by including the metal salt in the diazonium component whereby metallization occurs as the dye is formed.

In one embodiment where supplemental aromatic amines and secondary pyrazolone couplers are not employed, metallization is performed with at least one of a strontium salt and calcium salt. In another embodiment where supplemental aromatic amines and secondary pyrazolone couplers are employed, metallization is performed with at least one of a strontium salt and calcium salt.

In most applications, it is desirable, in order to achieve the full brightness and tinctorial strength, to heat the azo pigment. For example, the product of the metallization may be heated to reflux temperature for about 1 to about 3 hours or at temperatures above about 100° C. under pressure in the presence of the above-described resin soaps or other soluble resins.

After completion of the metallization, the azo pigments are recovered from the water-based reaction slurry by filtering to form a presscake of pigment which is washed with water so as to remove the excess acids, bases and salts that may form in the coupling reaction. The presscake is typically washed with from about 10 to about 20 times its volume of water, including cold warm or hot water. The filter cake is generally washed until the filtrate gives only a slightly positive test for chloride ion. The washed presscake can be dried, ground and used in the form of a coarse or finely divided powder. Alternatively, the azo pigments of this invention can be dispersed into oleoresinous vehicles to prepare flushed bases or dispersed into aqueous vehicles to prepare aqueous dispersions.

Examples of pigment compounds made in accordance with the present invention are represented by the following formulae.

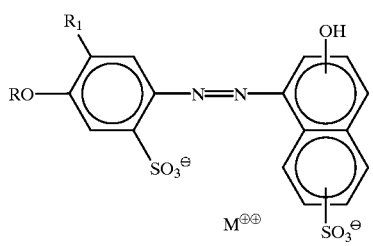

Formula (I)

wherein R is a lower alkyl group or a hydroxycarbyl group, $R_1$ is one of hydrogen, chloro, a lower alkyl group, and a lower alkoxy group and M is at least one of Ca, Sr, Ba, Mn, Mg or Zn.

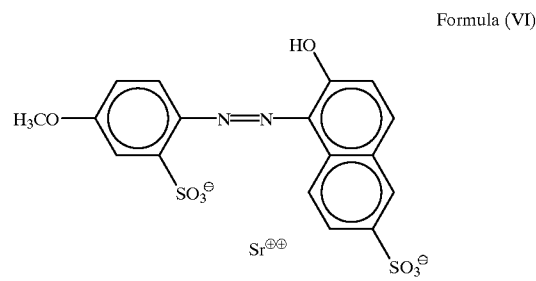

Formula (VI)

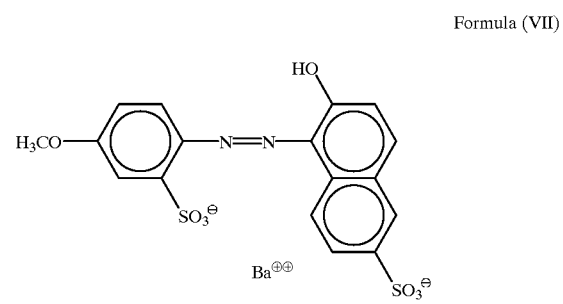

Formula (VII)

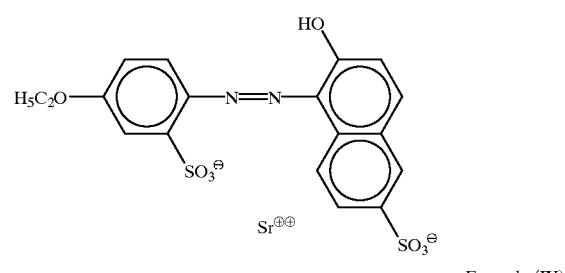

Formula (VIII)

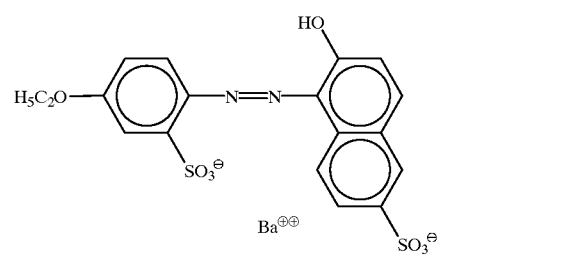

Formula (IX)

Additional compounds include those where supplemental aromatic amines and/or secondary couplers are employed.

The pigment compositions of the present invention provide blue shade red to magenta pigments having improved color strength, resistance to polar solvents, light fastness and/or heat stability and are useful as coloring agents in plastics, coatings and inks. In a preferred embodiment, the pigment compositions of the present invention provide magenta pigments having both improved color strength and improved heat stability. In one embodiment, the azo magenta pigment of the present invention does not contain chlorine. In another embodiment, the azo magenta pigment of the present invention contains one atom or less of chlorine.

Heat stability is the ability to resist decomposition at temperatures above about 150° C. In another embodiment, the azo magenta pigment of the present invention resists decomposition at temperatures above about 250° C. In yet another embodiment, the azo magenta pigment of the present invention resists decomposition at temperatures above about 350° C.

In other embodiments, therefore, the present invention relates to coating compositions including paint compositions, ink compositions and plastic compositions respectively comprising major amounts of a coating vehicle such as a paint vehicle, ink vehicle or plastic vehicle and minor amounts of the azo magenta pigment compositions. Major amounts mean 50% by weight or more while minor amounts mean less than 50% by weight.

The coating, ink and plastic compositions in which the compositions of this invention are useful are well known to those of ordinary skill in the art. Examples include printing inks, lacquers, thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polycarbonate, polyesters and rubber, and also filaments made of viscose and cellulose ethers, cellulose esters, polyamides, polyurethanes, polyesters, for example polyglycol terephthalates, and polyacrylonitrile. The pigments of the present invention are also useful for pigment printing and for the pigmenting of paper in the mass.

Due to their excellent heat resistance, the pigments are particularly suitable for the pigmenting of plastics in the mass, such as, for example, of polystyrene and its mixed polymers, polyolefins, in particular polyethylene and polypropylene and the corresponding mixed polymers, polycarbonate, polyvinyl chloride and polyesters in particular polyethylene glycol terephthalate and polybutylene terephthalate and the corresponding mixed condensation products based on polyesters.

Examples of coating compositions include paint compositions, adhesive compositions, and powder compositions. Thus, coating compositions include liquid based coating compositions and powder based coating compositions.

See, for example, with regard to ink: R. H. Leach, editor, *The Printing Ink Manual*, Fourth Edition, Van Nostrand Reinhold (International) Co.Ltd., London (1988), particularly pages 282–591; with regard to paints: C. H. Hare, *Protective Coatings*, Technology Publishing Co., Pittsburgh (1994), particularly pages 63–288; and with regard to plastics: T. G. Webber, *Coloring of Plastics*, John Wiley & Sons, New York (1979), particularly pages 79–204. The foregoing references are hereby incorporated by reference herein for their teachings of ink, paint and plastic compositions, formulations and vehicles in which the compositions of this invention may be used including amounts of colorants. For example, the pigment may be used at a level from about 10% to about 15% by weight in an offset lithographic ink, with the remainder being a vehicle containing gelled and ungelled hydrocarbon resins, alkyd resins, wax compounds and aliphatic solvent. The pigment may also be used, for example, at a level from about 1% to 10% by weight in an interior paint formulation along with other pigments which could include titanium dioxide, acrylic latices, coalescing agents, water or solvents. The pigment may also be used, for example, at a level from about 20% to about 30% by weight in a plastic color concentrate in polyethylene.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

Example 1

A diazo slurry is prepared by dissolving 19.2 parts of 2-amino-5-methoxybenzenesulfonic acid in 250 parts of water and 7 parts of 50% sodium hydroxide solution. The solution is cooled to 0° C. by the addition of ice and diazotized by the addition of 30 parts of a 25% solution of sodium nitrite and 34 parts of 20 Baume hydrochloric acid and stirring the slurry at 0–10° C. for 40 minutes followed by addition of 21 parts of strontium nitrate. Excess nitrite is quenched with sulfamic acid. A small amount of an antifoam agent is used to control the foam.

A coupler slurry is prepared by dissolving 26.6 parts of the potassium salt of 2-hydroxy-naphthalene-6-sulfonic acid (Schaeffer's Salt) by heating in 600 parts of water containing 9 parts of 50% sodium hydroxide and 4 parts of bis alkyl ester of sulfosuccinic acid and then cooled to 10° C. with ice.

The diazo slurry is coupled into the coupler slurry over a period of 40 minutes while maintaining the pH at 9 by addition of a 10% aqueous sodium hydroxide solution. The pH of the slurry is then raised to between 9.8 and 10 by addition of 10 percent solution of sodium hydroxide. The mixture is stirred 30 minutes, 25 parts strontium nitrate are added, stirred for an additional 70 minutes and heated at a rate of approximately 1° C./minute to 55° C. The slurry is held at 55° C. for 40 minutes. The pH of the slurry is adjusted to 8 and then heated to boil and boiled for 80 minutes. The slurry is then iced to lower than 50° C. and filtered; the filter cake is washed with water, dried overnight at 80° C. and pulverized to give a dark red (magenta) pigment powder.

COMPARATIVE EXAMPLE 1-1

The procedure of Example 1 is repeated except that 17.7 parts of 2-amino-5-methylbenzenesulfonic acid (4B Acid) are used in place of 19.2 parts of 2-amino-5-methoxybenzenesulfonic acid to give a red pigment powder.

COMPARATIVE EXAMPLE 1-2

The procedure of Example 1 is repeated except that 20.9 parts of 2-amino-4-chloro-5-methylbenzenesulfonic acid (2B Acid) are used in place of 19.2 parts of 2-amino-5-methoxybenzenesulfonic acid to give a red pigment powder.

COMPARATIVE EXAMPLE 1-3

The procedure of Example 1 is repeated except that 20.9 parts of 2-amino-4-methyl-5-chlorobenzenesulfonic acid (C Amine) are used in place of 19.2 parts of 2-amino-5-methoxybenzenesulfonic acid to give a red pigment powder.

COMPARATIVE EXAMPLE 1-4

The procedure of Example 1 is repeated except that 22.3 parts of 2-amino-4-ethyl-5-chlorobenzenesulfonic acid (Ethyl C Acid) are used in place of 19.2 parts of 2-amino-4-methoxybenzenesulfonic acid to give a red pigment powder.

EXAMPLE 2

A diazo slurry is prepared by dissolving 9.6 parts of 2-amino-5-methoxybenzenesulfonic acid in 200 parts of water and 3.5 parts of 50% sodium hydroxide solution. The solution is cooled to 0° C. by the addition of ice and diazotized by the addition of 15 parts of a 25% solution of sodium nitrite and 17 parts of 20 Baume hydrochloric acid and stirring the slurry at 0–10° C. for 40 minutes. Excess nitrite is quenched with sulfamic acid. A small amount of an antifoam agent is used to control the foam.

A coupler slurry is prepared by dissolving 13.3 parts of the potassium salt of 2-hydroxy-naphthalene-6-sulfonic acid (Schaeffer's Salt) by heating to 30° C. in 450 parts of water containing 3.8 parts of 50% sodium hydroxide and 2 parts of bis alkyl ester sulfosuccinic acid and then cooled to 10° C. with ice.

The diazo slurry is coupled into the coupler slurry over a period of 40 minutes while maintaining the pH at between 6 and 7. The pH of the mixture is then adjusted to 7. The mixture is stirred 20 minutes and heated at a rate of approximately 1° C./minute to 60° C. The pH of the mixture is adjusted to 9, 20 parts of barium chloride dihydrate are added, the mixture stirred at 60C for 40 minutes, heated to boil and boiled for 60 minutes. The slurry is then iced to lower than 55° C. and filtered; the filter cake is washed with water, dried overnight at 80° C. and pulverized to give a magenta pigment powder.

COMPARATIVE EXAMPLE 2-1

The procedure of Example 2 is repeated except that 17.7 parts of 2-amino-5-methylbenzenesulfonic acid (4B Acid) are used in place of 19.2 parts of 2-amino-4-methoxybenzenesulfonic acid to give a red pigment powder.

COMPARATIVE EXAMPLE 2-2

The procedure of Example 2 is repeated except that 20.9 parts of 2-amino-4-chloro-5-methylbenzenesulfonic acid (2B Acid) are used in place of 19.2 parts of 2-amino-5-methoxybenzenesulfonic acid to give a red pigment powder.

COMPARATIVE EXAMPLE 2-3

The procedure of Example 2 is repeated except that 20.9 parts of 2-amino-4-methyl-5-chlorobenzenesulfonic acid (C Amine) are used in place of 19.2 parts of 2-amino-4-methoxybenzenesulfonic acid to give a red pigment powder.

COMPARATIVE EXAMPLE 2-4

The procedure of Example 2 is repeated except that 22.3 parts of 2-amino-4-ethyl-5-chlorolbenzenesulfonic acid (Ethyl C Acid) are used in place of 19.2 parts of 2-amino-4-methoxybenzenesulfonic acid to give a red pigment powder.

TEST METHOD I

A mixture of 0.5 part pigment, 0.5 part titanium dioxide (DuPont Ti-Pure R) -960) and 500 parts high density polyethylene (Solvay T50-2000-G) is shaken on a paint shaker to uniformity, then injection molded at 232° C. in a 30 ton Baftenfield machine. Spectrophotometric values are measured with a Macbeth Color-Eye (specular component included, large area) to give the apparent strength and hue angle under Illuminant D, 10°, shown in the Table I.

TEST METHOD II

A mixture of 0.5 part pigment, 5.0 parts titanium dioxide (DuPont Ti-Pure R -960) and 500 parts high density polyethylene (Solvay T50-2000-G) is shaken on a paint shaker to uniformity, then injection molded at 232° C. in a 30 ton Battenfield machine. Spectrophotometric values are measured with a Macbeth Color-Eye (specular component included, large area) to give the apparent strength and hue angle under Illuminant D, 10°, shown in the Table II.

TABLE I

Results from Test Method I

| Pigment | Hue Angle | Apparent Strength (K/S) |
|---|---|---|
| Example 1 | 9.6 | 45.6 (Standard) |
| Comparative Example 1-1 | 29.1 | 40.4 (11% Weaker) |
| Comparative Example 1-2 | 31.2 | 40.5 (11% Weaker) |
| Comparative Example 1-3 | 34.7 | 34.9 (23% Weaker) |
| Comparative Example 1-4 | 28.2 | 33.4 (27% Weaker) |
| Example 2 | 1.7 | 52.0 (Standard) |
| Comparative Example 2-1 | 29.7 | 33.4 (36% Weaker) |
| Comparative Example 2-2 | 34.4 | 38.4 (26% Weaker) |
| Comparative Example 2-3 | 28.3 | 43.1 (17% Weaker) |
| Comparative Example 2-4 | 24.3 | 45.9 (12% Weaker) |

TABLE II

Results from Test Method II

| Pigment | Hue Angle | Apparent Strength (K/S) |
|---|---|---|
| Example 1 | 355.1 | 15.1 (Standard) |
| Comparative Example 1-1 | 16.7 | 10.0 (34% Weaker) |
| Comparative Example 1-2 | 21.7 | 11.5 (24% Weaker) |
| Comparative Example 1-3 | 35.2 | 7.5 (50% Weaker) |
| Comparative Example 1-4 | 17.2 | 12.0 (21% Weaker) |
| Example 2 | 346.9 | 17.2 (Standard) |
| Comparative Example 2-1 | 19.1 | 7.5 (56% Weaker) |
| Comparative Example 2-2 | 24.7 | 10.8 (37% Weaker) |
| Comparative Example 2-3 | 18.2 | 12.1 (30% Weaker) |
| Comparative Example 2-4 | 14.4 | 13.4 (22% Weaker) |

In the Tables I and II, the K/S value is a measure of the pigment strength. The higher the K/S value, the stronger the pigment. The pigments of Examples 1 and 2, made according to the invention, have higher K/S values and thus are stronger pigments than the comparative examples, which are not made in accordance with the present invention. Hue angle is evaluated based on a hue circle where 0°/360° corresponds to red, 90° corresponds to yellow, 180° corresponds to green, and 270° corresponds to blue. The closer a compound's hue angle is to approximately 350° to about 360° (or 0°), the closer the color of the compound corresponds to magenta. The pigments of Examples 1 and 2, made according to the invention, have hues that are closer to a true magenta color than the comparative examples, which are not made in accordance with the present invention.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising at least one compound characterized by the formula:

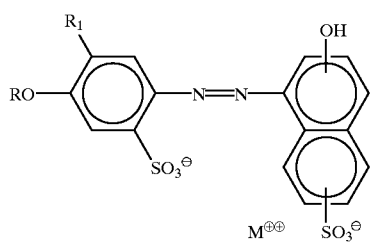

wherein R is a lower alkyl group or a hydroxycarbyl group, $R_1$ is hydrogen, chloro, a lower alkyl group, or a lower alkoxy group, and M is Ca, Sr, Ba, Mn, Mg or Zn.

2. A composition according to claim 1, wherein R is a methyl group and $R_1$ is hydrogen.

3. A composition according to claim 1, wherein R is an ethyl group and $R_1$ is hydrogen.

4. A composition according to claim 1, wherein M is Ca, Ba, or Sr.

5. A composition comprising at least one compound having the following chemical structure:

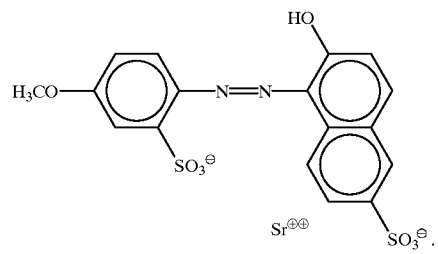

6. A composition of the following chemical structure:

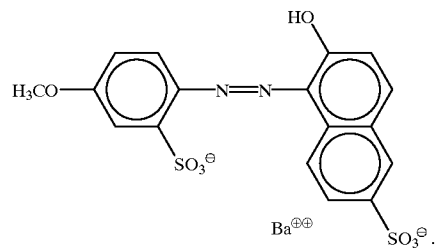

7. A composition of the following chemical structure

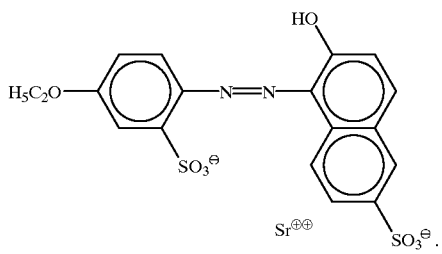

8. A composition of the following chemical structure

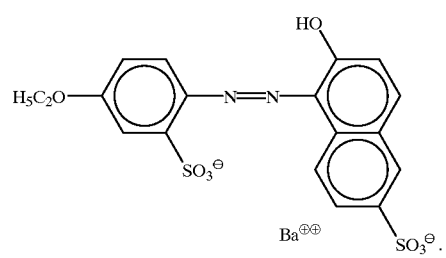

9. A process for preparing an azo pigment comprising coupling at least one diazonium component of one or more aromatic amines, wherein at least one aromatic amine has the formula:

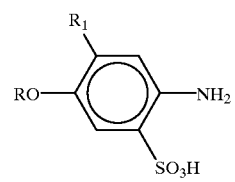

wherein R is a lower alkyl group or a hydroxycarbyl group and $R_1$ is hydrogen, chloro, a lower alkyl group, or a lower alkoxy group with at least one hydroxynaphthalenesulfonic acid coupling component to form an azo dye; and metallizing the azo dye with a divalent metal.

10. A process according to claim 9, wherein the at least one hydroxynaphthalenesulfonic acid coupling component comprises 2-hydroxynaphthalene-6-sulfonic acid.

11. A process according to claim 9, wherein the divalent metal comprises one of Ca, Sr, Ba, Mn, Mg or Zn.

12. A process according to claim 9, wherein R is one of methyl, ethyl or propyl, and $R_1$ is hydrogen.

13. A process according to claim 9, wherein the diazonium component comprises at least one compound represented by

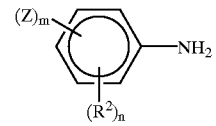

wherein each $R^2$ is independently a halogen, hydrocarbyl, hydrocarbyloxy, carboxylic acid ester, sulfonic acid ester, carboxylic acid amide, imidazolone, sulfonic acid amide or nitro group; n is 0, 1 or 2; each Z is independently a —COOH or —$SO_3H$ group, or salts of such groups; and m is 1 or 2.

14. A process according to claim 9, wherein a ratio of equivalents of the diazonium component to the coupling component is from about 0.8:1 to about 1.1:1.

15. A process according to claim 9, further comprising heating the metallized azo dye for about 1 to about 3 hours at temperatures above about 100° C.

16. A coating composition comprising a coating vehicle and the composition of claim 1.

17. A coating composition according to claim 16, wherein the coating vehicle is a paint.

18. A coating composition comprising a coating vehicle and the azo pigment made by the process of claim 9.

19. An ink composition comprising an ink vehicle and the composition of claim 1.

20. An ink composition comprising an ink vehicle and the azo pigment made by the process of claim 9.

21. A plastic composition comprising a plastic material and the composition of claim 1.

22. A plastic composition according to claim 21, wherein the plastic material is at least one of a polyolefin, a polyacrylic compound, a polyvinyl compound, a polycarbonate, a polyester, a rubber, a cellulose ether, a cellulose ester, a polyamide, a polyurethane, and a polyacrylonitrile.

23. A plastic composition comprising a plastic material and the azo pigment made by the process of claim 9.

* * * * *